United States Patent [19]

Smith et al.

[11] Patent Number: 4,614,842

[45] Date of Patent: Sep. 30, 1986

[54] SECRETARIAL TELEPHONE STATION WITH DISTRIBUTED PROCESSING FOR USE WITH A SECRETARIAL ANSWERING SYSTEM

[75] Inventors: Louis W. Smith, St. Petersburg, Fla.; John S. Csapo, Oakton, Va.

[73] Assignee: GTE Communications Systems Corp., Northlake, Ill.

[21] Appl. No.: 540,462

[22] Filed: Oct. 11, 1983

[51] Int. Cl.$^4$ .................... H04M 1/50; H04M 3/50; H04M 3/58

[52] U.S. Cl. .................... 179/27 FH; 179/18 BD; 179/84 L; 179/84 VF

[58] Field of Search .......... 179/18 BD, 18 B, 18 AD, 179/27 FH, 27 FG, 84 VF, 84 L

[56] References Cited

U.S. PATENT DOCUMENTS

| | | | |
|---|---|---|---|
| 4,296,282 | 10/1981 | O'Neil et al. .................... | 179/99 LS |
| 4,351,986 | 9/1982 | Fechalos .................... | 179/27 FH |
| 4,436,963 | 3/1984 | Cottrell et al. .................... | 179/18 B |

*Primary Examiner*—Thomas W. Brown
*Attorney, Agent, or Firm*—Gregory G. Hendricks

[57] ABSTRACT

A secretarial telephone station for use with a secretarial answering system and a switching system which includes a plurality of subscriber telephone stations each equipped with a buzzer. The secretarial answering system is connected to the subscriber stations and transmits subscriber station busy, idle and ringing status and line identification information to the secretarial station. The secretarial station includes a lamp and switch pair for each associated subscriber station, first and second processing units, and an audible signalling circuit. The first processing unit receives this information according to a link bus protocol for packetized messages. The second processing unit receives this information and causes the lamp associated with each of the subscriber stations to display dark, lit or flashing signals corresponding to the idle, busy and ringing status. The second processing unit also causes the audible signalling circuit to provide a ringing tone whenever a lamp is flashed. In response to operation of the switch associated with a called subscriber station, the second processing unit transmits a directed call pickup and a call transfer message to the switching system which route the subscriber's incoming call to the secretarial station for screening. A buzzing requested message is then transmitted to the secretarial answering system via the first processing unit according to a link bus protocol for packetized messages. The buzzing requested message informs the secretarial answering system to cause the subscriber station's buzzer to provide an audible signal indicating that the current incoming call has been screened by a secretary.

13 Claims, 11 Drawing Figures

SECRETARIAL TELEPHONE STATION WITH DISTRIBUTED PROCESSING FOR USE WITH A SECRETARIAL ANSWERING SYSTEM

CROSS REFERENCE TO RELATED APPLICATION

The present application is related to the following and commonly assigned patent applications, all of which were concurrently filed in the names of the same inventors: Ser. No. 540,463, entitled "SECRETARIAL ANSWERING SYSTEM", now U.S. Pat. No. 4,574,165 Ser. No. 540,464, entitled "SECRETARIAL ANSWERING SYSTEM WITH DISTRIBUTED PROCESSING"; and Ser. No. 540,465, entitled "SECRETARIAL TELEPHONE STATION FOR USE WITH A SECRETARIAL ANSWERING SYSTEM", now U.S. Pat. No. 4,567,324. Another related, co-pending and commonly assigned patent application is Ser. No. 452,587, entitled "TELEPHONE FEATURE ASSIGNMENT CIRCUIT". This application was filed in the names of L. W. Smith and A. L. Wolf.

FIELD OF THE INVENTION

The present invention relates to telephone switching systems and more particularly to a secretarial telephone answering system.

BACKGROUND OF THE INVENTION

Secretarial telephone answering systems and secretarial telephone stations are old and well known. These systems and stations are connected to a switching system or private automatic branch exchange (PABX) having directed call pickup and call transfer features. Typically these systems included a complex secretarial telephone station connected directly to the PABX. In addition, each individual subscriber telephone station, which is to receive secretarial answering service, is also connected to the secretarial station. With such an arrangement a large and unwieldy cable comprising the line pairs for each such subscriber station are connected to the secretarial station. This arrangement involves heavy cabling cost both for installation and maintenance. Also, if the location of the secretarial station is to be changed, extensive recabling is required.

An alternative arrangement for providing the secretarial answering service, requires the secretary to identify which telephone is ringing by listening to the ringing signal from the called subscriber station. The secretary then dials the telephone number of the ringing subscriber station in the directed call pickup mode in order to intercept the incoming call. Once the call has been screened by the secretary the number of the called telephone station must again be dialed from the secretarial station in the call transfer mode. This is a cumbersome and lengthy procedure and is difficult to implement when several calls must be intercepted and transferred at approximately the same time.

SUMMARY OF THE INVENTION

In accordance with the present invention, a secretarial telephone station is provided for use with a telephone switching system including a switching center, a plurality of subscriber telephone stations connected to the switching center, each of which is operable as a calling or called subscriber station, and a secretarial answering system connected to the subscriber stations and operative to provide, in a predetermined signalling protocol, ringing, busy and idle detected messages each including a ringing, busy or idle code, respectively, and a code identifying a called subscriber station.

The secretarial station includes a first processing unit connected to the secretarial answering system and operative to receive and decode the ringing, busy and idle detected messages in the predetermined signalling protocol, a second processing unit connected to the first processing unit and the switching center, and a plurality of lamp and switch pairs connected to the second processing unit, each pair being associated with one of the subscriber stations.

The second processing unit being operative in response to the decoded ringing, busy and idle detected messages to flash, light or darken, respectively, the lamp associated with the called subscriber station. The second processing unit is further operative in response to operation of the switch associated with the called subscriber station to apply to the switching center a directed call pick up message including a directed call pick up code and a code identifying the called subscriber station. The second processing unit is further operative in response to subsequent operation of the switch to apply to the switching center, a call transfer message, including a call transfer code and a code identifying the called subscriber station. It is further operative, in response to the subsequent switch operation, to provide a buzzing requested message including a code identifying the called subscriber station.

The first processing unit is operative to receive, format and transmit the buzzing requested message to the secretarial telephone answering system in the predetermined signalling protocol.

DESCRIPTION OF THE PREFERRED EMBODIMENT

Figure 1:
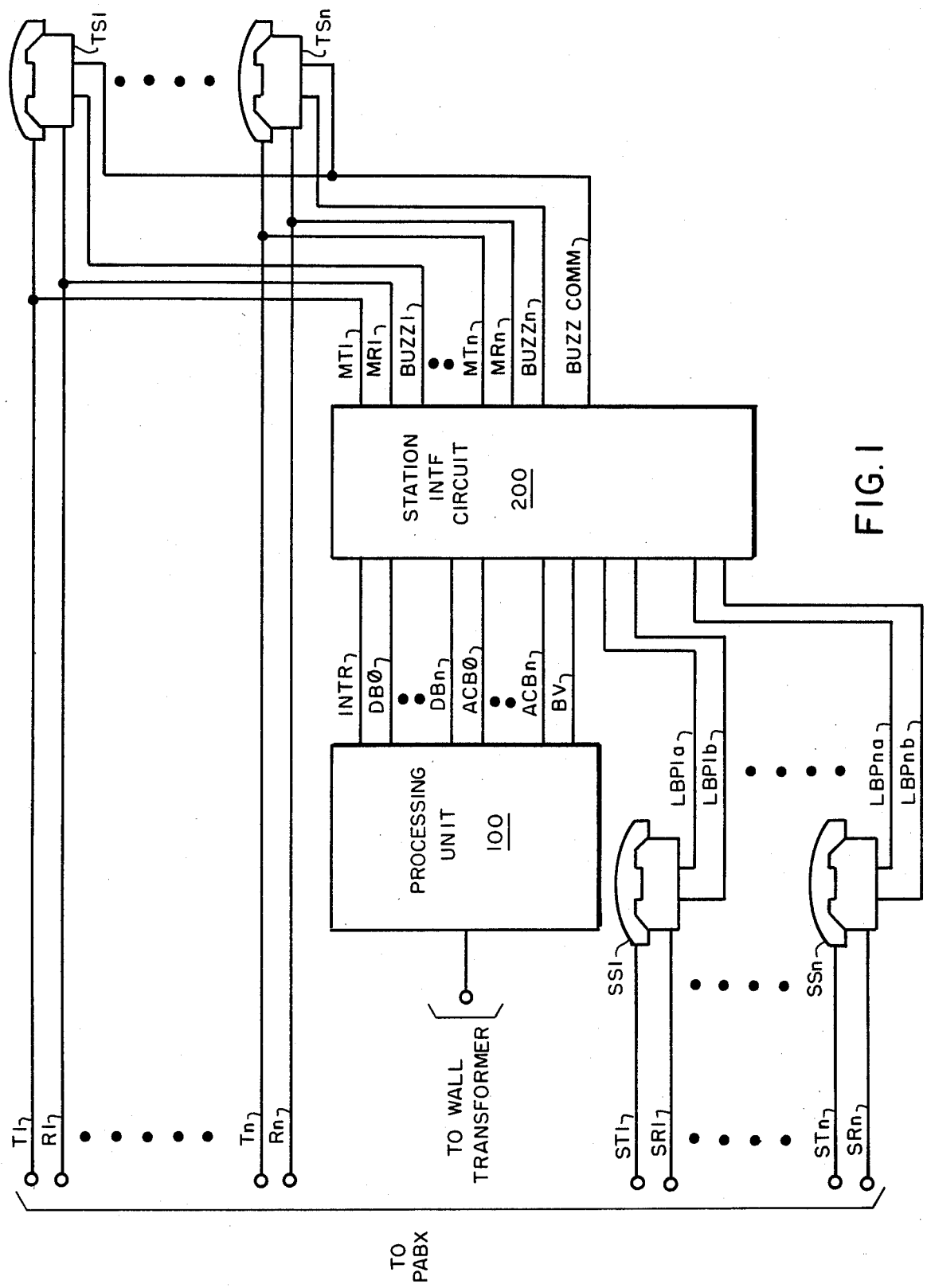
FIG. 1 is a block diagram of the secretarial answering system and secretarial telephone station of the present invention.

Referring now to FIG. 1 of the accompanying drawing, the secretarial telephone answering system and secretarial telephone stations of the present invention are shown connected to a private automatic branch exchange (PABX) which is further connected to a plurality of subscriber telephone stations.

Processing unit 100 is shown connected to a wall transformer and to station interface circuit 200. This station interface circuit is typically connected to a maximum of 30 subscriber stations and four secretarial stations. These subscriber stations can be full featured electronic feature phones or plain old telephone service (POTS) telephones equipped with a buzzer. Each subscriber station is connected to the PABX via tip and ring leads, e.g., T1 and R1. Each of these subscriber stations is further connected to an associated line circuit in station interface circuit 200 via monitored tip and ring leads, e.g., MT1 and MR1, a buzzer signalling lead, e.g., BUZZ 1, and a common buzzer control lead (BUZZ COMM).

Each secretarial station is also connected to the PABX and to the station interface circuit. For example, secretarial station 1 is connected to the PABX via tip and ring leads ST1 and SR1, respectively, and it is further connected to station interface circuit 200 via a pair of link bus protocol leads LBPla and LBPlb. Processing unit 100 is connected to station interface circuit 200 via interrupt lead INTR1, data bus leads DBO–DBN, address and control bus leads ACBO–ACBN and buzzing voltage lead BV.

With this arrangement cabling cost for the secretarial telephone answering system is virtually eliminated since processing unit 100 and station interface circuit 200 are located adjacent to the PABX. Therefore, the subscriber telephone stations TS1–TSn are connected to the line circuits at the PABX rather then running a thick cable including two line pairs, for each subscriber station, from the PABX to a remote secretarial station. However, in accordance with the present invention the secretarial stations can still be remotely located without incurring excessive cable cost since only one pair of link bus protocol leads need be connected between the station interface circuit and an associated secretarial station.

In order for a secretary to provide secretarial telephone answering service the secretary must be able to monitor the busy, idle or ringing status of connected subscriber stations. Thus visual and audible indications of such status for each subscriber station must be available to the secretary at the secretarial station. Each secretarial station is therefore equipped with a lamp for each monitored subscriber station and an electronic ringer. Each such lamp is dark, lit or flashing when the associated subscriber station is idle, busy or ringing, respectively. Information to cause these visual indications is provided to the secretarial station by processing unit 100 and station interface circuit 200 via the link bus protocol leads, LBPla-b.

When an incoming call is made to a particular subscriber station via the PABX, the associated lamp flashes at the secretarial station. A secretary then causes that call to be routed to the secretarial station by the directed call pickup feature in the PABX. This feature is initiated at the secretarial station by operation of a direct station selection switch associated with the ringing subscriber station. Operation of such switch causes the secretarial station to transmit a directed call pickup signal and the telephone number of the called subscriber station to the PABX. The PABX detects the directed call pickup signal and reroutes the incoming call from the called subscriber station to the secretarial station. The secretary can then answer the call for screening purposes.

In the event that the secretary, after screening a call, desires to transfer it back to the called subscriber station, the secretary again operates the direct station selection switch associated with the called subscriber station. The secretarial station responds to this second operation of the direct station selection switch by transmitting a call transfer access code and the telephone number associated with the original called subscriber station to the PABX. The secretarial station also transmits a message to the station interface circuit to cause it to buzz the called subscriber station for a short time (approximately ½ second). This buzzing signal alerts the station subscriber that the current incoming call was previously screened by a secretary.

The PABX then routes the incoming call away from the secretarial station and back to the called subscriber station and applies ringing current to it. The station interface circuit continues to monitor the ringing, busy and idle status of the called subscriber station and presents this information in visual form, as indicated by the dark, lit or flashing light associated with that called subscriber station.

Figure 2:
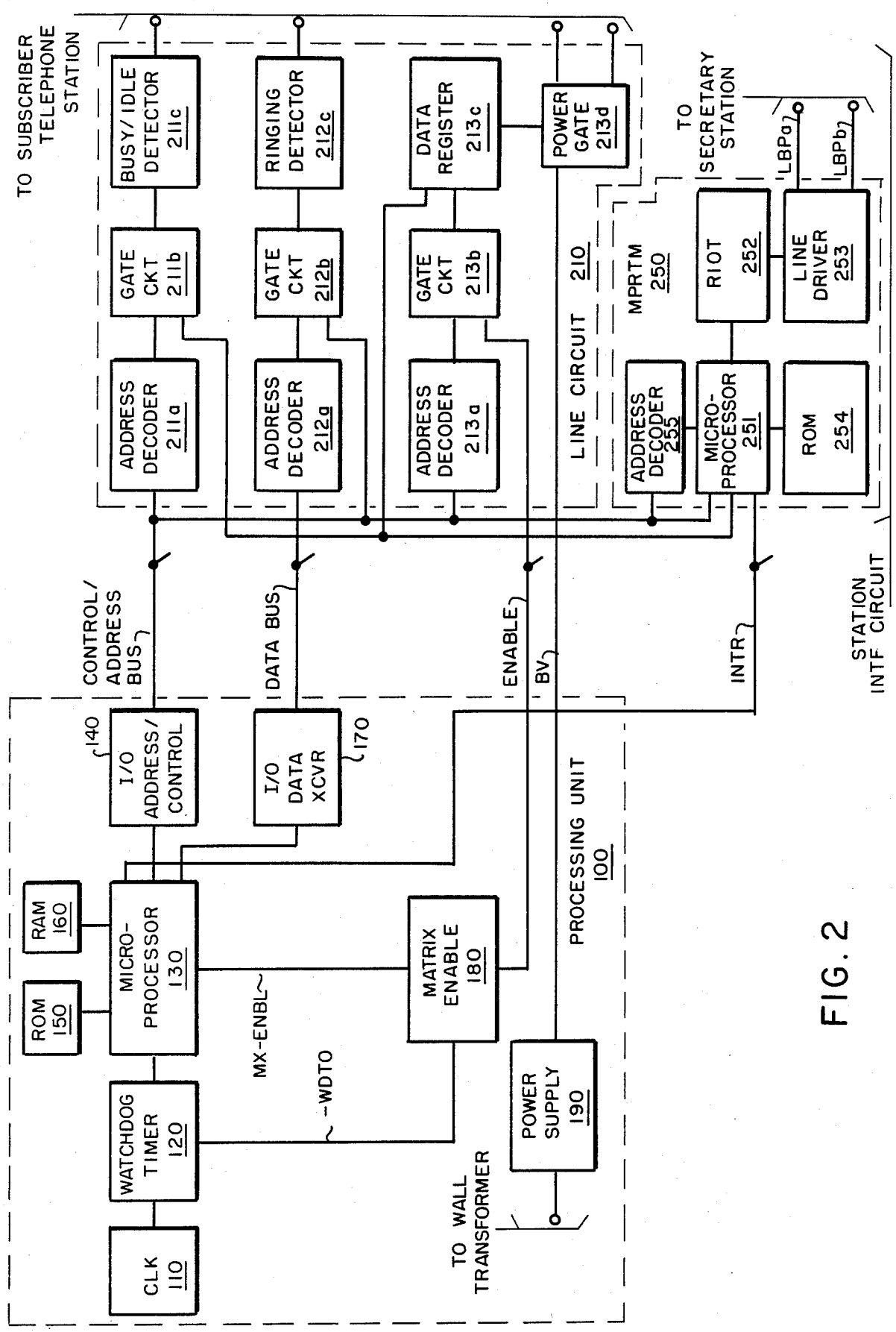
FIG. 2 is a block diagram of the processing unit and station interface circuit shown in FIG. 1.

Referring now to FIG. 2, processing unit 100 and station interface circuit 200, of FIG. 1, are shown. Processing unit 100 includes Clock circuit 110 which is connected to Watch Dog Timer 120. This timer is further connected to Matrix Enable circuit 180 and Microprocessor 130 which is connected to Read-Only-Memory (ROM) 150 and Random-Access-Memory (RAM) 160. Microprocessor 130 is also connected to I/O Address/Control circuit 140, I/O Data Transceiver 170, and Matrix Enable circuit 180. Microprocessor 130 is further connected to Microprocessor 251 in Mini-Packet Receive and Transmit Module (MPRTM) 250. This module is included in station interface circuit 200. Power supply 190 is connected between a wall transformer and Switching Matrix (Power Gate circuit) 213d in station interface circuit 200.

Clock circuit 110 includes a 2 MHz crystal oscillator to provide a source for all timing signals. Watch Dog Timer 120 includes a divider which must be reset every second by Microprocessor 130 in order to prevent generation of a watch-dog-time-out signal.

I/O Address/Control circuit 140 includes storage registers which are loaded by Microprocessor 130 with data bits representing the address of devices to be written into or read from. This I/O Address/Control circuit also includes registers to store read and write control signals from Microprocessor 130.

I/O Data Transceiver 170 includes registers which store data bits being transferred from Microprocessor 130 to various external circuits when the microprocessor is writing into those circuits. These registers also store data bits from the external circuits when the microprocessor is reading from these external circuits.

Matrix Enable circuit 180 includes gating circuitry which provides an Enable signal when Microprocessor 130 does not provide a disable signal and Watch Dog Timer 120 does not provide a watch-dog-time-out signal. The Enable signal is applied to Station Interface circuit 200 in order to ensure that external signalling is only performed when the Processing Unit 100 is operating properly. For example, the Enable signal is not generated when there is a watch-dog-time-out since this indicates a software or hardware malfunction. Also the Enable signal is not provided when Microprocessor 130 applies a Disable signal to matrix enable circuit 180. This Disable signal is provided under software control in the event of various processing unit failures such as a power failure. In this manner external signalling is only performed when Processing Unit 100 is operating properly, thus ensuring the validity of any external signals applied to Station Interface circuit 200, the various subscriber stations and the secretarial station.

Power Supply 190 provides a low voltage BUZZ signal which is applied to Station Interface circuit 200. This signal is used to alert the selected subscriber station that an incoming call has been screened by the secretary. Microprocessor 130 also receives interrupt (INTR) signals from Microprocessor 251. These signals inform Microprocessor 130 that data is available from Microprocessor 251.

Station Interface circuit 200 includes a plurality of Line circuits 210 and at least one Secretarial Interface circuit 214. Line circuit 210 includes Busy/Idle Detector circuit 211*a-c*, Ringing Detector circuit 212*a-c* and Signalling Matrix Control circuit 213*a-c*. Each of these circuits is connected to both I/O Address/Control circuit 140 and I/O Data Transceiver 170. Signalling Matrix Control circuit 213*a-c* is further connected to Matrix Enable circuit 180. Switching matrix (Power Gate) circuit 213*d* is connected to Signalling Matrix Control circuit 213*a-c*and Power Supply circuit 190. Busy/Idle Detector circuit 210 and Ringing Detector circuit 220 are further connected to associated subscriber stations in order to monitor their busy, idle and ringing status. Similarly switching matrix 213*d* is connected to an associated subscriber station via the BUZZ signalling and BUZZ COMM leads. Processing unit 100 is thus able to apply a buzzing signal to a selected telephone station via these leads. Station Interface circuit 200 also includes Mini-Packet Receive and Transmit Module 250. This module includes Microprocessor 251 which is connected to I/O Address/Control circuit 140, I/O Data Transceiver 170 and Microprocessor 130. Microprocessor 251 is further connected to ROM 254 and RAM-I/O-Timer (RIOT) circuit 252 which is connected to Line Driver 253. This line driver is further connected to an associated secretarial station.

Busy/Idle Detector circuit 211*a-c* and Ringing Detector circuit 212*a-c* each monitor the associated subscriber station for changes in busy, idle and ringing status of that subscriber station. Microprocessor 130 periodically scans these detector circuits to determine the busy, idle and ringing status of the associated subscriber stations. This periodic scanning is done at 10 millisecond intervals under control of a 100 Hz real time clock signal from Clock circuit 110.

In order to scan the detector circuits, 211*a-c*and 212*a-c*, Microprocessor 130 applies the address bits associated with a selected busy/idle or ringing detector to I/O Address/Control circuit 140. Microprocessor 130 also applies a Read signal to this control circuit.

When address decoders 211*a* and 212*a* decode their respective address bits and a Read signal, they enable Gate circuits 211*b* and 212*b*, respectively. Busy/Idle Detector 211*c* and Ringing Detector 212*c* then apply data representative of the busy, idle or ringing status to I/O Data Transceiver 170 via Gate circuits 211*b* and 212*b*, respectively. Microprocessor 130 then retrieves such data signals from transceiver 170 and updates a status table in RAM 160.

If a particular subscriber station is receiving an incoming call as indicated by a ringing signal, Ringing Detector circuit 212*a-c* would detect this ringing signal. This ringing signal status would then be available to Microprocessor 130 on the next scan of Ringing Detector circuit 212*a-c*. Microprocessor 130 then compares this ringing status with the previous status of that subscriber station as indicated in the status table in RAM 160. Since this particular subscriber station had previously been idle, the change to ringing signal status represents an incoming call for this subscriber station.

Microprocessor 130 then writes the appropriate address bits into I/O Address/Control circuit 140 to select Microprocessor 251 in preparation for transmission of ringing detected message to the Secretarial Station via Microprocessor 251. Microprocessor 130 then applies a Write command to I/O Address/Control circuit 140 and a parallel ringing detected message to Data Transceiver 170. This ringing detected message indicates ringing status and the identity of the subscriber station which is now receiving an incoming call. Microprocessor 251 then receives the Write command signal from I/O Address/Control circuit 140, retrieves the message from I/O Data Transceiver 170 and stores it in the RAM portion of RIOT circuit 252. Microprocessor 251 then transmits this message in serial format to the secretarial station via the I/O portion of RIOT circuit 252 and line driver 253. This serial transmission is under the control of the Timer portion of RIOT circuit 252. This RIOT circuit is available from SYNERTEK under part number SY6532 and is described in the 1983 SYNERTEK manual.

The connected secretarial station receives this message, retrieves the ringing status information and the subscriber station identification and causes a light to flash which is associated with that subscriber station. In this manner the secretarial station provides a visual indication that an incoming call is being received at a particular subscriber station. The secretarial station also includes an audible signalling device which is activated in response to receipt of any such message indicating that a subscriber station is receiving an incoming call.

The secretary then depresses a direct station select (DSS) switch associated with the ringing subscriber station. The secretarial station responds to operation of an individual DSS switch by transmitting a directed-call-pick-up message to the PABX via the secretarial station's tip and ring leads (ST and SR). This message includes a code representative of the PABX directed-call-pick-up feature followed by a code identifying the called subscriber station. The PABX then transfers the incoming call from the subscriber station to the secretarial station. After screening the call, if the secretary determines that it should be received at the originally called subscriber station the secretary again operates the DSS switch. This time the secretarial station transmits a buzzing requested message to Station Interface circuit 200. This message includes a code identifying the called subscriber station which will subsequently provide an audible buzzing signal. This buzzing requested message is received by Microprocessor 251 via RIOT circuit 252 and line driver 253.

Microprocessor 251 then applies an interrupt signal to Microprocessor 1350 via the INTR lead. Microprocessor 130 then retrieves this buzzing signal message from Microprocessor 251 by applying the appropriate address and Read signals to I/O Address/Control circuit 140. Microprocessor 251 responds to receipt of its address and Read signals to transmit the buzzing requested message to I/O Data Transceiver 170. Microprocessor 130 then retrieves the buzzing requested message from this transceiver and stores it RAM 160.

Since there are no power or other catastrophic failure conditions present, the Disable signal is not applied by Microprocessor 130 to Matrix Enable circuit 180. Similarly since there are no catastrophic software errors the watch-dog-time-out signal is not provided by Watch Dog Timer 120. Consequently, Matrix Enable circuit 180 applies an Enable signal to Gate circuit 213b in signalling matrix control circuit 213a–c.

Microprocessor 130 then applies a Write signal and the address signals representative of signalling matrix control circuit 213a-c to I/O Address/Control circuit 140. It also applies data representative of a buzzing control signal to I/O data transceiver 170. Upon being enabled by its address signals, the Write signal and the Enable signal, Gate circuit 213b enables Data Register 213c to receive the buzzing control signal from I/O data transceiver 170. Data Register 213c then enables Power Gate (Switching Matrix) 213d which then gates the Buzzing Voltage from power supply 190 to the selected subscriber station. This Buzzing Voltage then causes the subscriber station to provide an audible buzzing signal which alerts the subscriber station user that the current incoming call has been screened by the secretary.

The secretarial station further operates in response to this second operation of the DSS switch to transmit a call transfer message to the PABXs via the tip and ring (ST and SR) leads. This message includes a code representative of the PABX call transfer feature followed by a code identifying the called subscriber station. The PABX then transfers the call from the secretarial station to the originally called subscriber station and applies ringing current to it. Thus, the subscriber station user is alerted via the audible buzzing signal that the current incoming (ringing) call has been screened by the secretary.

In the event that the originally called subscriber station became busy while the secretary was screening a call to that station, Microprocessor 130 would have detected this status via Busy/Idle Detector circuit 211a-c. It would then send a message to the secretarial station, via MPRTM 250, to cause that subscriber station's light to become lit, thereby indicating the busy condition of that subscriber station. In this case the secretary would not transfer the call back to the busy subscriber station.

Figure 3:
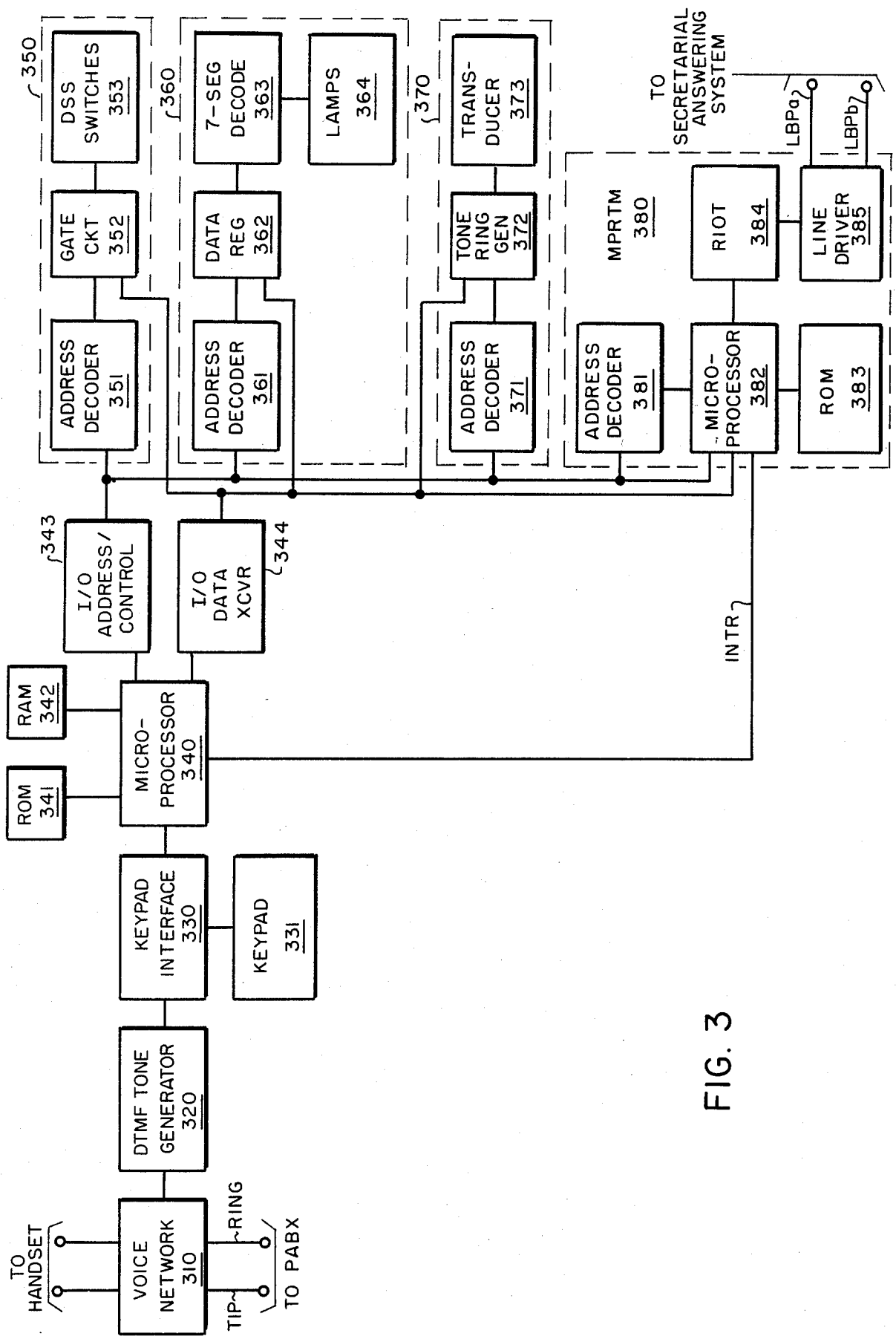
FIG. 3 is a block diagram of the secretarial telephone station shown in FIG. 1.

Referring now to FIG. 3, the block diagram of the secretarial station is shown. This secretarial station includes Voice Network 310 having Tip and Ring leads connected to the PABX of FIG. 1. This voice network is also connected to a Handset for use by the secretary. Dual tone multifrequency (DTMF) Tone Generator 320 is connected between Voice Network 310 and Key Pad Interface 330 which is further connected to Key Pad 331. Microprocessor 340 is connected to Key Pad Interface 330, ROM 341 and RAM 342. Microprocessor 340 is further connected to I/O Address/Control circuit 343 and I/O Data Transceiver 344, both of which are connected to Switch circuit 350, Lamp circuit 360, Transducer circuit 370 and Mini-Packet Receive and Transmit Module (MPRTM) 380.

Switch circuit 350 includes Gate circuit 352 connected between Address Decoder 351 and DSS switch 353, Lamp circuit 360 includes Data Register 362 connected between Address Decoder 361 and 7-Segment Decoder 363 which is connected to Lamps 364. Transducer circuit 370 includes Ringing Tone Generator 372 connected between Address Decoder 371 and Transducer 373. MPRTM 380 includes Address Decoder 381 which is connected between Microprocessor 382 and I/O Address/Control circuit 343. This microprocessor is further connected to ROM 383 and RIOT circuit 384. This RIOT circuit is further connected to Line Driver 385 which is connected to the Secretarial Answering System via Link Bus Protocol leads LBPa and LBPb. I/O Address/Control circuit 343 is connected to address Decoders 351, 361, 371 and 381 while I/O Data Transceiver 344 is connected to Gate circuit 352 Data Register 362, Ringing Tone Generator 372 and Microprocessor 382 which is further connected to Microprocessor 340.

As previously described, when an incoming call is received at a subscriber station, Processing Unit 100 transmits a ringing detected message to the secretarial station indicating the identity of the subscriber station that is receiving an incoming call. This message is transmitted in serial format to MPRTM 380 via the link bus protocol (LBP) leads.

Microprocessor 382 receives this message via Line Driver 385 and the I/O and Timer portions of RIOT circuit 384. It then stores this message in the RAM portion of RIOT circuit 384 and generates and interrupt on the INTR lead. Upon detection of this interrupt signal Microprocessor 340 applies the Read signal and address bits representative of MPRTM 380 to I/O Address/Control circuit 343. Address Decoder 381 enables Microprocessor 382 upon detection of its address bits. Upon being enabled, Microprocessor 382 detects the Read signal and transfers the ringing detected message from the RAM portion of RIOT circuit 384 to I/O Data Transceiver 344 in parallel format. Microprocessor 340 stores this message in RAM 342 and subsequently retrieves it for analysis to determine its content, i.e., ringing status code and identification code for the ringing subscriber station.

Microprocessor 340 then applies a Write signal and the address bits representative of Lamp circuit 360 to I/O Address/Control circuit 343 and a lamp data bit to I/O Data Transceiver 344. Address Decoder 361, upon decoding its specific address bits, enables Data Register 362 which then stores the lamp data bit from I/O Data Transceiver 344. The stored lamp data bits are then decoded by 7-Segment Decoder 363 and the selected lamp is lit. Microprocessor 340 also applies a Write signal and the address bits representative of Transducer circuit 370 to I/O Address/Control circuit 343, and an audible signalling data bit to Data Transceiver 344. Address Decoder 371, upon decoding its specific address bits enables Ringing Tone Generator 372. This tone generator then applies a ringing control signal to Transducer 373 under control of the audible signalling data bit. Transducer 373 responds to this ringing control signal by providing a corresponding audible ringing signal. Microprocessor 340 provides these lamp and audible signalling data bits periodically in order to cause the lamps to flash and the transducer to provide periodic bursts of audible ringing signal. Since each lamp is assigned to a different subscriber station this flashing lamp and audible ringing signal indicate to the secretary that a particular subscriber station is receiving an incoming call.

When the secretary determines that an incoming call should be routed to the secretarial station, the secretary depresses the DSS switch associated with the ringing subscriber station. Operation of this switch is detected by Gate circuit 252.

Microprocessor 340 periodically scans the gate circuits in Switch circuit 350 by applying a Read signal and address bits representative of Address Decoder 351 to I/O Address/Control circuit 343. The DSS switch status from Gate circuit 352 is then transferred to I/O Data Transceiver 344. Microprocessor 340 then transfers this switch status data from I/O Data Transceiver 344 to RAM 342, and subsequently retrieves it for analysis to determine changes in switch status and the associated subscriber station identification.

Microprocessor 340 then transmits a directed call pickup message including a code representative of the PABX directed call pickup feature followed by a code identifying the subscriber station associated with the operated DSS switch. These codes are transmitted via Key Pad Interface circuit 330 to DTMF Generator 320. This interface circuit includes a gating circuit to allow either Microprocessor 340 or Key Pad 331 to provide the row and column signals necessary to cause DTMF tone generator 320 to provide corresponding DTMF tones.

In this case DTMF tone generator 320 under control of microprocessor 340 transmits DTMF tone signals representative of the call transfer code and a code identifying the ringing subscriber station. These DTMF tones are transferred to the PABX via Voice Network 310 and the Tip and Ring leads.

The PABX to the directed call pickup message by transferring the incoming call from the called subscriber station to the secretarial station. The secretary then lifts the handset to talk to the calling party.

After screening the call, if the secretary determines that it should be received by the subscriber station that was originally called, the secretary again depresses the DSS switch associated with that telephone station. Operation of that DSS switch is again detected by Microprocessor 340 in the same manner as previously described. Upon determining the identity of the subscriber station associated with that switch, Microprocessor 340 sends a buzzing request message to Station Interface circuit 200 (FIG. 1) via MPRTM 380.

To transmit this message, Microprocessor 340 applies a Write command and address bits representative of MPRTM 380 to I/O Address/Control circuit 343, and data bits representative of the buzzing requested message to I/O Data Transceiver 344. When Address Decoder 381 detects the respective address bits, it enables Microprocessor 382, and upon being enabled, Microprocessor 382 detects the Write signal and transfers the buzzing requested message from I/O Data Transceiver 344 to the RAM portion of RIOT circuit 384. Microprocessor 382 then retrieves this message from the RAM portion of RIOT circuit 384 and transmits it in period format to Station Interface circuit 200 (FIG. 2) via the I/O and Timer portions of RIOT circuit 384, Line Driver 385 and link bus protocol lead LBP. Processing unit 100 receives this message via Station Interface circuit 200 and applies the previously described signals to the buzzer associated with the called subscriber station, thereby audibly alerting that subscriber station user that the current incoming call has previously been screened by the secretary.

Microprocessor 340 also causes DTMF tones representative of the call transfer message to be transmitted via voice network 310 to the PABX. This message includes a call transfer code and a code identifying the called subscriber station. The PABX then reroutes the call from the secretarial station to the originally called subscriber station which is concurrently informed by the audible buzzing signal that this call had been screened by the secretary.

The assignment of the subscriber stations to the switches on the secretarial station is programmable as described in U.S. Pat. No. 4,453,040. The switches on the secretarial station are programmed to be secretarial answering service switches and each is assigned to one of the Line Circuits which monitors an associated subscriber station. The assignment of the switches on different secretarial stations may be the same, may vary in order, and may exclude some of the lines. The secretarial answering switch may also be intermingled with switches used to control features such as monitor on/-off, etc. One of these features, Extended Group, allows the secretarial answering switches to be divided into two groups, a primary and a secondary group. The primary group of switches is always active and displayed. The secondary group of switches will be active and displayed when the Extended Group feature is on.

Figure 4:
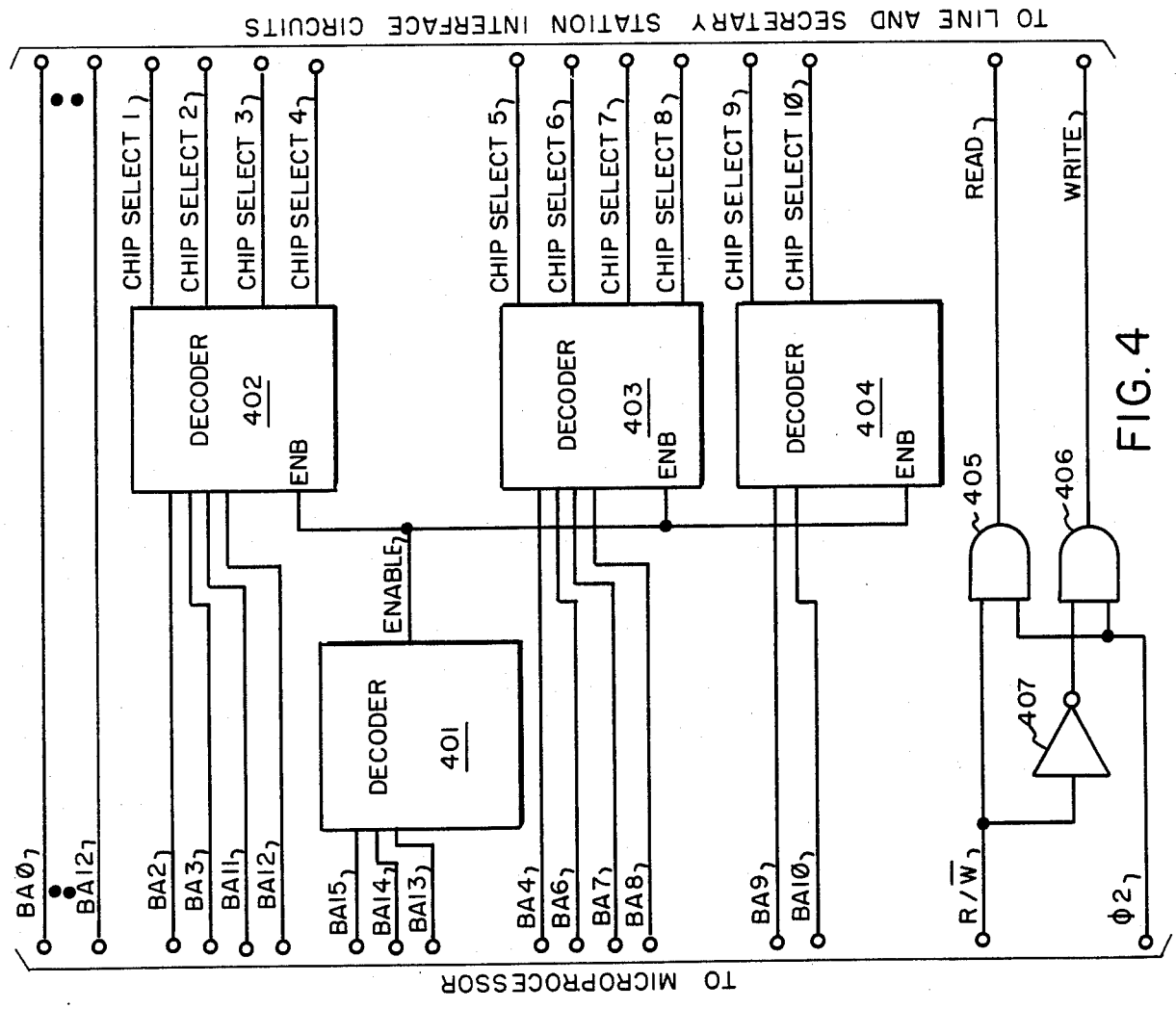
FIG. 4 is a logic diagram of the I/O ADDRESS/CONTROL circuit shown in FIG. 2.

Referring now to FIG. 4, the I/O Address/Control circuit of FIG. 2 is shown. This circuit includes Decoder 401 connected between the microprocessor and decoders 402, 403 and 404. AND gates 405 and 406 are also connected to the microprocessor. Inverter 407 is connected between the microprocessor and AND gate 406.

Decoder 401 decodes the most significant three (3) bits of the microprocessor. When these bits produce a "011" combination, Decoder 401 provides an Enable signal which causes Decoders 402, 403 and 404 to decode the rest of the address lines. These decoders produce ten (10) device select lines which are divided between the line and station interface circuits. The BA0—BA12 address lines directly drive the individual line and station interface circuits. The Read and Write signals are derived from the R/$\overline{\text{W}}$ and phase 2 (02) signals from the microprocessor.

Figure 5:
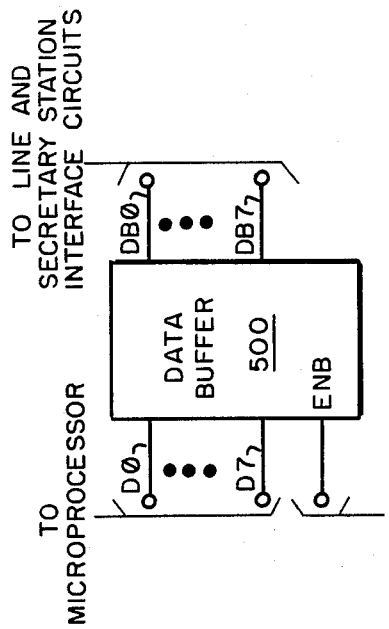
FIG. 5 is a logic diagram of the I/O DATA XCVR circuit shown in FIG. 2.

Referring now to FIG. 5, the I/O Data Transceiver of FIG. 2 is shown. This circuit includes Data Buffer 500 which provides a bi-directional bus to and from Microprocessor 130. It also drives and isolates the microprocessor from the line and secretary station interface circuits.

Figure 6:
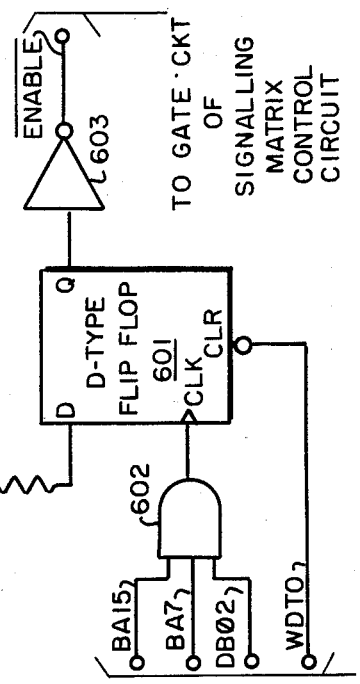
FIG. 6 is a logic diagram of the MATRIX ENABLE circuit shown in FIG. 2.

Referring now to FIG. 6, the Matrix Enable circuit of FIG. 2 is shown. This circuit includes D-type flip-flop 601 connected between NAND gate 602 and Inverter 603. Flip-flop 601 is reset by the WDTO signal which operates as a reset or clear signal. When this flip-flop is reset, a logic level 0 signal appears at its Q output. The logic level 0 signal is then inverted to a logic level 1 $\overline{\text{ENABLE}}$ signal which causes the Gate circuit of the Signalling Matrix Control Circuit to prevent the buzzing voltage (BV) signal from being applied to the Power Gate circuit.

To cause the buzzing voltage (BV) to be applied to the Power Gate circuit, Microprocessor 130 applies a logic level 1 MX-ENBL signal to the DB02 lead, and logic level 1 signals to the BA15 and BA7 address leads. When NAND gate 602 detects these logic level 1 signals, it applies a logic level 0 signal to the clock (CLK) input of D-type flip-flop 601. Since the Data (D) input of this flip-flop is connected to a +5 V source, this flip-flop provides a logic level 1 signal at its Q output when clock by the logic level 0 signal at its $\overline{\text{CLK}}$ input. Inverter 603 then provides a logic level 0 $\overline{\text{ENABLE}}$ signal to cause the buzzing voltage to be applied to the Power Gate circuit.

Figures 7, 8:
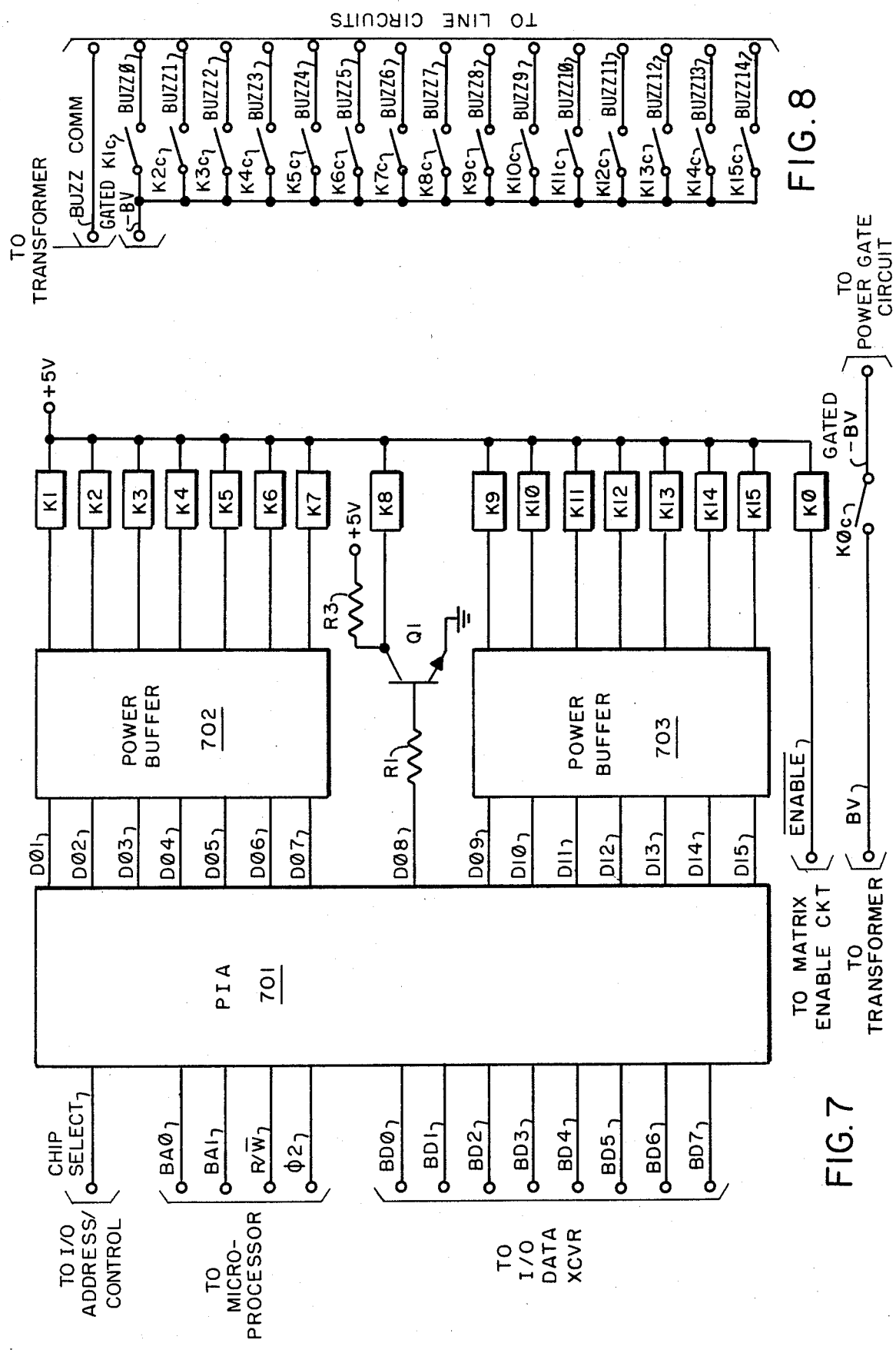
FIG. 7 is a schematic diagram of a signalling matrix control circuit corresponding to blocks 213a, b and c shown in FIG. 2.
FIG. 8 is a schematic diagram of a switching matrix corresponding to block 213d shown in FIG. 2.

Referring now to FIG. 7, the Signalling Matrix Control circuit (213a–c of FIG. 2) is shown. This circuit includes Peripheral Interface Adapter (PIA) 701 connected to Power Buffer 702, Power Buffer 703 and resister R1 which is connected to transistor Q1. Power Buffers 702 and 703 are further connected to relays K1–K7 and K9–K15, respectively, and transistor Q1 is further connected to relay K8. PIA 701 is further connected to the I/O Address/Control circuit via the Chip Select lead, the microprocessor via the BA0, BA1, R/$\overline{\text{W}}$ and phase 2 (Φ2) (Capital 0 with a 1)2 leads, and the I/O Data XCVR via the BD0–BD7 leads. This circuit also includes relay K0 which is connected to the Matrix Enable circuit and relay contact K0c which is connected between the Transformer and the Power Gate circuit. PIA 701 is a double 8-bit register such as Motorola's MC6821. Power Buffers 702 and 703 are also available from Motorola.

When the microprocessor causes the Matrix Enable circuit to provide a logic level 0 $\overline{\text{ENABLE}}$ signal, relay K0 is operated and contact K0c closes. This causes the 24VAC buzzing voltage (BV) to be applied to the Power Gate circuit. However, in order to distribute this GATED-BV signal to selected line circuits, the appropriate buzzing relay (K0–K15) must be operated.

To operate these relays the microprocessor provides address signals representative of the Signalling Matrix Control circuit. The I/O Address/Control circuit then applies a logic level 1 signal to the Chip Select lead. The microprocessor also applies logic level 1 signals to the BA0 or BA1 leads depending on whether relays K1–K8 or K9–15 are to be operated. The data to operate the relays is provided by I/O Data XCVR on the BD0–BD7 leads.

When the microprocessor provides a logic level 0 write ($\overline{\text{W}}$) signal and a logic level 1 phase 2 (Φ2) signal to PIA 701, the data appearing on the BD0–BD7 leads is transferred to Power Buffer 702 and transistor Q, if a logic level 1 signal appears on the BA0 lead. Similarly, the data appearing on the BD0–BD7 leads is transferred to Power Buffer 703 if a logic level 1 signal appears on the BA1 lead. These Power Buffers and transistor provide the necessary driving currents to operate relays K0–K15. These relays are operated when a logic level 1 signal appears on the correspond BD lead.

Referring now to FIG. 8, the Switching Matrix (213d of FIG. 2) is shown. This circuit includes relay contacts K1–K15 which apply the buzzing signals BUZZ-0–BUZZ14 to the subscriber stations.

Figure 9:
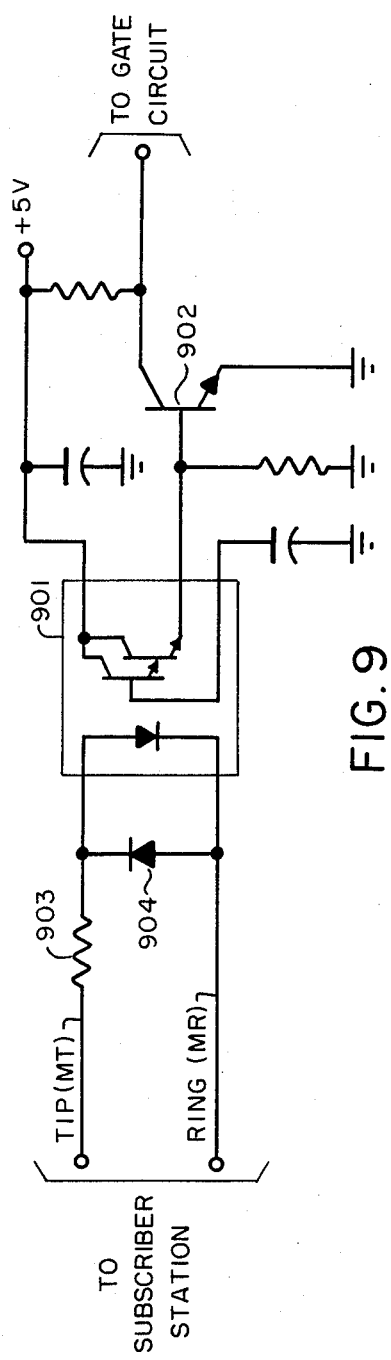
FIG. 9 is a schematic diagram of the BUSY/IDLE DETECTOR circuit shown in FIG. 2.

Referring now to FIG. 9, the Busy/Idle Detector circuit of FIG. 2 is shown. This circuit is connected in parallel across the Tip and Ring leads and includes Optical Isolator 901 and Transistor 902. The tip and ring (MT and MR) leads of the monitored subscriber station are connected to Optocoupler 901 via the series combination of resistor 903 and rectifier diode 904.

In the on-hook condition, the voltage across the Tip and Ring leads is approximately 50 VDC. This voltage drives a current through the light emitting diode of Optocoupler 901. The Darlington amplifier of Optocoupler 901 then turns on and drives transistor 902 into saturation.

In the off-hook condition, the voltage across the tip and ring leads is between 7 and 10 VDC. This voltage produces a lock current which turns off Optocoupler 901 and consequently transistor 902. The idle condition is indicated by a logic level 0 (saturated state of Transistor 902) signal and the busy condition is indicated by a logic level 1 (open state of Transistor 902) signal.

Figure 10:
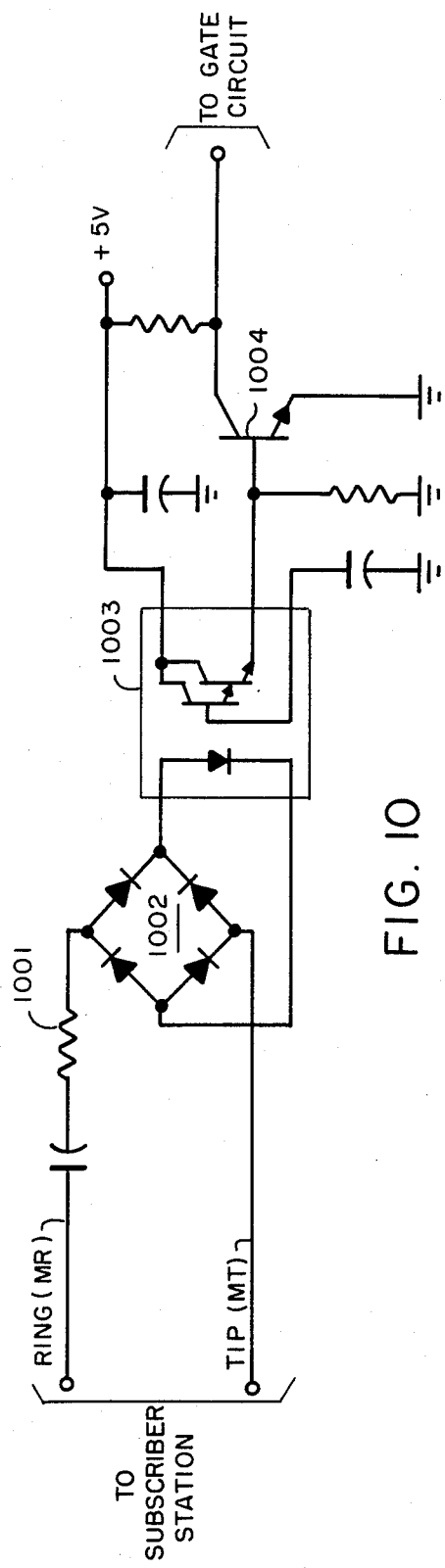
FIG. 10 is a schematic diagram of the RINGING DETECTOR circuit shown in FIG. 2.

Referring now to FIG. 10, the Ringing Detector of FIG. 2 is shown. This circuit includes resistor 1001, bridge 1002, Optocoupler 1003 and transistor 1004. The resistor and capacitors connected to Optocoupler 1003 represent signal shaping circuitry.

Resistor 1001 limits the current of the ringing signal passing through it, to 1.88 amps. Bridge 1002 rectifies this limited ringing signal and applies it to Optocoupler 1003. When this Optocoupler detects the rectified ringing signal its Darlington amplifier goes into saturation. This causes transistor 1004 to turn on and apply a logic level 0 Ringing Detected signal to Processing Unit 100. When ringing current is not present, the Darlington amplifier of Optocoupler 1003 is not saturated. Consequently, transistor 1004 is turned off and a logic level 1 signal is applied to Processing Unit 100 to indicate absence of a ringing signal.

Figure 11:
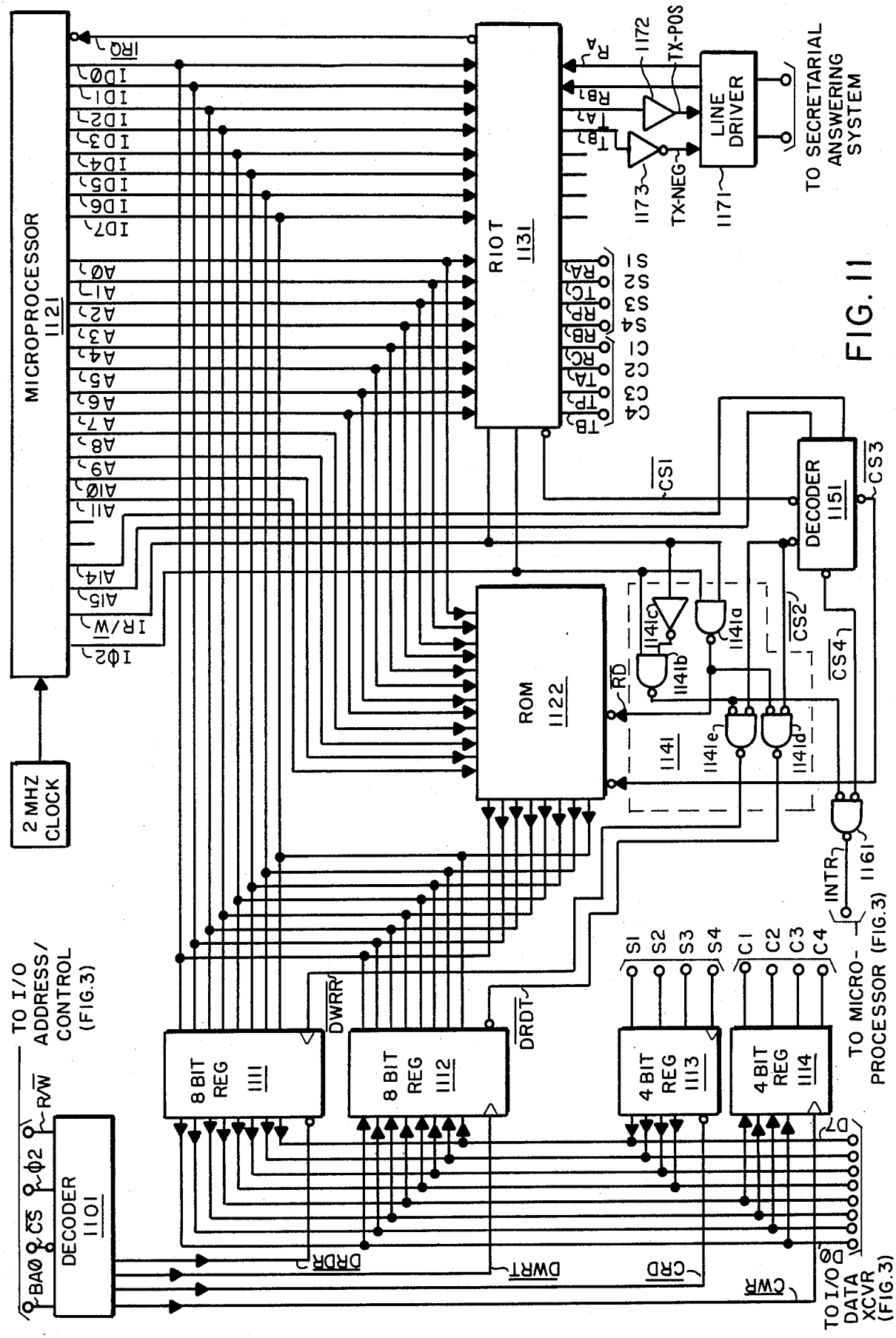
FIG. 11 is a detailed logic diagram of the MPRTM shown in FIG. 2.

Referring now to FIG. 11, the Mini-Packet Receive and Transmit module (MPRTM) of FIG. 3 is shown. This module is connected to the I/O Address/Control circuit of FIG. 3 via the read/write (R/$\overline{\text{W}}$), phase 2 (Φ2), chip select ($\overline{\text{CS}}$) and buffer address 0 (BA0) leads. This module is further connected to the I/O Data XCVR of FIG. 3 via the data (D0–D7) leads. Additional connections are to the microprocessor of FIG. 3 via the interrupt ($\overline{\text{INTR}}$) lead, and to the secretarial answering system via Line Driver 1171.

This module includes Microprocessor 1121 which is connected to a 2 MHz clock. This microprocessor is further connected to random-access-memory-I/O-timer (RIOT) circuit 1131 via interrupt request lead $\overline{\text{IRQ}}$, internal data leads ID0–ID7, address leads A0–A7, internal read/write lead IR/$\overline{\text{W}}$ and internal phase 2 lead IΦ2. This RIOT module is a commerically available device produced by Rockwell International under part number 6532. This RIOT circuit is further connected to Line Driver 1171 via receive leads (RA and RB) and transmit leads (TA and TB). The signals on these leads are buffered by gates 1172 and 1173 to produce signals on the transmit-positive (TX-POS) and transmit-negative (TX-NEG) leads. This RIOT circuit is connected to Decoder 1151 via the chip select (CS1) lead, to 4-bit register 1113 via status leads S1–S4 and to 4-bit register 1114 via control leads C1–C4. Decoder 1151 is connected to Microprocessor 1121 via the IR/$\overline{\text{W}}$ and IΦ2- leads. This decoder is further connected to gate circuit 1141 via the CS2 lead, to Read-Only-Memory (ROM) 1122 via the CS3 lead and to gate 1161 via the CS4 lead.

Gate circuit 1141 includes NAND gate 1141a which is connected to Microprocessor 1121 via the IΦ2 and the IR/$\overline{\text{W}}$ leads. The first input of NAND gate 1141b is also connected to Microprocessor 1121 via the IΦ2 lead. However, the second input of this gate is connected to inverter 1141c which is then connected to Microprocessor 1121 via the IR/$\overline{\text{W}}$ lead. NAND gates 1141a and b are further connected to NAND gates 1141d and e, respectively. Both of these gates are further connected to Decoder 1151 via the CS2 lead. The output of gate 1141a is also connected to ROM 1122 via the read ($\overline{\text{RD}}$) lead and the output of gate 1141b is connected to NAND gate 1161. The output of gate 1141d is connected to 8-bit register 1112 via the data read transmit ($\overline{\text{DRDT}}$) lead and the output of gate 1141e is connected to 8-bit register 1111 via the data write receive ($\overline{\text{DWRR}}$)

lead. Registers 1111 and 1112 are 74LS374 octal D-type flip-flops.

Decoder 1101 is connected to register 1111 via the data read receive ($\overline{\text{DRDR}}$) lead, to 8-bit register 1112 via the data write transmit ($\overline{\text{DWRT}}$) lead, to 4-bit register 1113 via the control read ($\overline{\text{CRD}}$) lead and to 4-bit register 1114 via the control write ($\overline{\text{CWR}}$) lead. All of these registers are further connected to the I/O data XCVR via the D0-D7 leads. Microprocessor 1121 is further connected to ROM 1122 via address leads A0-A11 and internal data leads ID0-ID7. It is also connected to 8-bit registers 1111 and 1112 via the ID-0-ID7 leads.

When Microprocessor 340 communicates with the MPRTM, it must address the MPRTM via the chip select ($\overline{\text{CS}}$) and BAO leads. It then provides a read or write signal as defined by a logic level 1 or O, respectively, R/$\overline{\text{W}}$ signal. Decoder 1101 detects the read or write signal and the phase 2 ($\Phi$2) signal. Depending on whether the BAO signal is a logic level 0 or 1 decoder 1101 then provides data read and write signals ($\overline{\text{DRDR}}$ and $\overline{\text{DWRT}}$) or control read and write ($\overline{\text{CRD}}$ and $\overline{\text{CWR}}$) signals, respectively. If a data write ($\overline{\text{DWRT}}$) signal is provided, data is transferred from the I/O data transceiver to 8-bit register 1112. If the data read (DRDR) signal is decoded, data transferred from 8-bit register 1111 to the I/O data transceiver. Similarly, if the control write ($\overline{\text{CWR}}$) signal is decoded, control signals are transferred to 4-bit register 1114 from the I/O data transceiver. If the control read ($\overline{\text{CRD}}$) signal is decoded, data is transferred to the I/O data transceiver from 4-bit register 1113.

If Microprocessor 340 transfers data into 8-bit register 1112, this data can be retrieved by Microprocessor 1121 and stored in the random-accessmemory (RAM) portion of RIOT circuit 1131. Similarly, Microprocessor 1121 can transmit data to Microprocessor 340 by retrieving data from the RAM portion of RIOT circuit 1131 and storing it in 8-bit register 1111. In order to facilitate such data transfers Microprocessor 1121 must provide the appropriate internal read or write (R/$\overline{\text{W}}$), phase 2 ($\Phi$2) and address (A14 and A15) signals. Decoder 1151 decodes these address signals and provides corresponding chip select signals to enable RIOT circuit 1131 (CS1), ROM 1122 (CS3), and interrupt gate 1161 (CS4) decoded chip select signal CS2 is applied to gate circuit 1141. This circuit gates the CS2 signal with decoded IR/$\overline{\text{W}}$ and I$\Phi$2 signals to provide the $\overline{\text{DRDT}}$ and $\overline{\text{DWRR}}$. The $\overline{\text{DWRR}}$ signal enables data transfers from Microprocessor 1121 to 8-bit register 1111 and the $\overline{\text{DRDT}}$ signal enables data transfers from 8-bit register 1112 to Microprocessor 1121. Gate circuit 1141 decodes the I$\Phi$2 and IR/$\overline{\text{W}}$ signals to provide a read ($\overline{\text{RD}}$) signal to ROM 1122 and a write ($\overline{\text{WR}}$) signal to interrupt gate 1161. Gate circuit 1141 combines these $\overline{\text{RD}}$ and $\overline{\text{WR}}$ signals with the CS2 signal to provide the $\overline{\text{DRDT}}$ and $\overline{\text{DWRR}}$ signals, respectively. RIOT circuit 1131 decodes the IR/$\overline{\text{W}}$ and I$\Phi$2 signals directly.

When Microprocessor 340 transmits data to the MPRTM it must first transmit control signals to the MPRTM to request Microprocessor 1121 to go into a receive mode of operation. These control signals are transmitted via decoder 1101 and register 1114. RIOT circuit 1131 receives these control signals via an I/O. These signals are then available to Microprocessor 1121 via the ID0-ID7 leads. The status of Microprocessor 1121 is also available to Microprocessor 340 via the status leads (S1-S4) which appear at the same I/O port of RIOT circuit 1131. Thus synchronization is achieved between Microprocessor 1121 and Microprocessor 340 by exchange of control and status signals via registers 1113-1114 and RIOT circuit 1131. This exchange of handshake signals ensures that the microprocessors are in synchronism before data transfers are initiated.

Actual data transfers between the microprocessors are similarly achieved via registers 1111-1112 and the RAM portion of RIOT circuit 1131. After data is so transferred to the RAM, via register 1112, Microprocessor 1121 converts it to serial format and transmits it the secretarial answering system via Line Driver 1171. Similarly, data can be transmitted by Microprocessor 1121 to Microprocessor 340. In this case Microprocessor 1121 receives serially formatted data from the secretarial answering system via Line Driver 1171, stores it in the RAM and subsequently transfers it to Microprocessor 340 via register 1111. However, before such data transfer is initiated, Microprocessor 1121 interrupts Microprocessor 340 in order to cause Microprocessor 340 to again initiate an exchange of handshake signals to ensure synchronism between the microprocessors. To initiate that interrupt signal, Microprocessor 1121 provides the appropriate A14 and A15 address bits to Decoder 1151 which then provides Chip Select signal CS2. Gate circuit 1141 then decodes the write ($\overline{\text{WR}}$) signal from the R/$\overline{\text{W}}$ signal and the phase 2 ($\Phi$2) signal. Interrupt gate 1161 then provides the interrupt ($\overline{\text{INTR}}$) signal in response to these CS2 and $\overline{\text{WR}}$ signals.

When Microprocessor 1121 transfers data to or from the secretarial answering system, these transfers are made via the input-output (I/O) portion of RIOT circuit 1131. This I/O circuit is selected by the appropriate address bits (AO-A7) and the chip select (CS1) signal. Data transfers are then made by the I/O circuit and the timer portion of RIOT circuit 1131 informs Microprocessor 1121, via the $\overline{\text{IRQ}}$ lead, of the generation and detection of Return-to-Zero pulses appearing at the I/O port. Microprocessor 1121 thus controls the conversion of data between the parallel format used by the MPRTM and the serial format used by Line Driver 1171. This microprocessor can also be used to perform other routine tasks such as error detection.

Thus the secretarial answering system and secretarial telephone station of the present invention allow an incoming call to a particular subscriber telephone station to be routed to a secretarial station for screening. The secretary can then reroute the call to the originally called subscriber station and provide a buzzing signal to that subscriber station to indicate to that station's user that the current incoming call had been previously screened by the secretary.

It will be obvious to those skilled in the art that numerous modifications of the present invention can be made without departing from the spirit of the invention.

What is claimed is:

1. A secretarial telephone station for use with a telephone switching system including a switching center, a plurality of subscriber telephone stations connected to said switching center, each of which is operable as a calling or called subscriber station, and a secretarial answering system connected to said subscriber stations and operative to provide, in a predetermined signalling protocol, ringing, busy and idle detected messages each including a ringing, busy or idle code, respectively, and a code identifying a called subscriber station, said secretarial station comprising:

a first processing unit connected to said secretarial answering system and operative to receive and decode said ringing, busy and idle detected messages in said predetermined signalling protocol;

a second processing unit connected to said first processing unit and said switching center; and a plurality of lamp and switch pairs connected to said second processing unit, each pair being associated with one of said subscriber stations;

said second processing unit being operative in response to said code identifying a called subscriber station and said decoded ringing, busy and idle detected messages to flash, light or darken, respectively, a lamp associated with said identified called subscriber station;

said second processing unit being further operative in response to operation of a switch to apply to said switching center a directed call pick up message including a directed call pick up code and a code identifying said associated subscriber station;

said second processing unit being further operative in response to subsequent operation of said switch to apply to said switching center a call transfer message, including a call transfer code and said code identifying said associated subscriber station, and further operative, in response to said subsequent switch operation, to provide a buzzing requested message including said code identifying said associated subscriber station;

said first processing unit being operative to receive, format and transmit said buzzing requested message to said secretarial telephone answering system in said predetermined signalling protocol.

2. A secretarial telephone station as claimed in claim 1, wherein said directed call pickup and call transfer messages each include a plurality of pairs of row and column signals, said second processing unit comprising:

a microprocessor operative to provide said pairs of row and column signals; and tone generation means connected between said microprocessor and said switching center and operative in response to each of said pairs of row and column signals to provide a corresponding pair of dual tone multifrequency tones.

3. A secretarial telephone station as claimed in claim 2, wherein there is further included a key pad also operative to provide a plurality of pairs of row and column signals, said tone generation means comprising:

gating means connected to said microprocessor and said key pad, and operative in response to said pairs of row and column signals from either said microprocessor or said key pad to provide gated pairs of row and column signals; and a dual tone multifrequency tone generator connected to said gating means and operative in response to said gated pairs of row and column signals to provide said corresponding pairs of dual tone multifrequency signals.

4. A secretarial telephone station as claimed in claim 2, wherein said secretarial answering system transmits said ringing, busy, and idle messages in analog format, and said microprocessor provides said buzzing requested message in digital format, said processing unit further comprising a bi-directional line driver connected between said microprocessor and said secretarial answering system, and operative to convert said ringing, busy and idle messages to digital format, and apply such digital formatted messages to said microprocessor, and further operative to convert said digital buzzing requested message to analog format and apply such analog formatted message to said secretarial answering system.

5. A secretarial telephone station as claimed in claim 1, wherein said second processing unit further comprises:

a first microprocessor;

first microprocessor storage means connected to said first microprocessor;

an input-output data storage circuit connected to said first microprocessor;

an input-output address and control circuit connected to said first microprocessor; and a lamp circuit, a switch circuit and an audible transducer circuit, all connected to said first microprocessor storage means and said input-output address and control circuit;

said first microprocessor being operative to sequentially provide a different address signal for each of said lamp, switch and audible transducer circuits, and further operative to provide a write signal for said lamp and audible transducer circuits and a read signal for said switch circuit;

said input-output address and control circuit being operative to temporarily store each address signal and to provide first and second control signals in response to said read and write signals, respectively;

said first microprocessor being operative to store said busy, idle and ringing detected codes and said code identifying the called subscriber station in said first microprocessor storage means;

said first microprocessor being further operative to transfer a lamp data signal for said called subscriber station and an audible transducer data signal to said input-output data storage circuit which in response thereto, provides stored lamp data and transducer data signals;

said lamp and audible transducer circuits being operative in response to their respective addresses and said second control signal to receive said stored lamp data and said stored audible data signal, respectively, and to provide a corresponding ringing, busy or idle visual signal for the associated called subscriber station or a corresponding audible signal for the associated called subscriber station, respectively;

said switch circuit being operative in response to its address signal and said first control signal to transfer a plurality of switch signals to said input-output data storage circuit; and said first microprocessor being operative to retrieve said switch signals from said input-output data storage circuit and to store said switch signals in said first microprocessor storage means, each of said switch signals being associated with a buzzing request message for a corresponding subscriber station.

6. A secretarial telephone station as claimed in claim 5, wherein said lamp circuit comprises:

a lamp circuit address decoder connected to said input-output address and control circuit and operative in response to its address signal to provide a lamp enable signal;

a lamp decoder connected to said lamp circuit address decoder and said input-output data storage circuit and operative in response to said lamp enable signal and each stored lamp data signal to provide an associated lamp drive signal; and a plurality of lamps, connected to said lamp decoder and each operative in response to an associated continuous or periodic lamp drive signal to provide a visual signal representative of the busy or ringing status, respectively, of an associated called subscriber station, and further operative in response to an absence of said lamp drive signal to inhibit said visual signal thereby providing a visual indication of an associated idle subscriber station.

7. A secretarial telephone station as claimed in claim 6, wherein said lamp decoder comprises a seven segment decoder.

8. A secretarial telephone station as claimed in claim 5, wherein said audible transducer circuit comprises:

a transducer address decoder connected to said input-output address and control circuit and operative in response to its address signal to provide a transducer enable signal;

a transducer gating circuit connected to said transducer address decoder and said input-output data storage circuit and operative in response to said transducer enable signal and each stored transducer data signal to provide a transducer driver signal; and an audible transducer connected to said transducer gating circuit and operative in response to said transducer driver signal to provide an audible signal indicative of a ringing subscriber station.

9. A secretarial telephone station as claimed in claim 5, wherein: said switch circuit comprises:

a switch address decoder connected to said input-output address and control circuit and operative in response to its address signal to provide a switch enable signal;

a plurality of switches each associated with one of said subscriber stations and operative to provide a switch signal; and a switch gating circuit connected to said switch address decoder, said switches and said input-output data storage circuit and operative in response to said switch enable signal to gate said switch signals to said input-output data storage circuit.

10. A secretarial telephone station as claimed in claim 5, wherein said microprocessor storage means comprises a random-access-memory.

11. A secretarial telephone station as claimed in claim 5 wherein said first processing unit comprises:

a second microprocessor;

a second microprocessor storage means and a line driver connected to said second microprocessor;

said second microprocessor being further connected to said first microprocessor, said input-output address and control circuit, and said input-output data storage circuit;

said second microprocessor being operative in response to a particular address signal and said second control signal to receive said buzzing requested message and store it in said second microprocessor storage means;

said second microprocessor being further operative to retrieve said stored buzzing requested message from said second microprocessor storage means and transmit it to said secretarial answering system via said line driver;

said second microprocessor being further operative to receive said ringing, busy and idle detected messages from said line driver, store said ringing, busy and idle detected messages in said second microprocessor storage means and subsequently provide an interrupt signal;

said first microprocessor being operative in response to said interrupt signal to provide said particular address signal to said second microprocessor and to provide said read signal;

said input-output address and control circuit being again operative in response to said read signal to provide said first control signal;

said second microprocessor being operative in response to said particular address signal and said first control signal to store said ringing, busy or idle detected message in said input-output data storage circuit which then provides a stored ringing, busy or idle detected message, respectively; and said first microprocessor being operative to retrieve said stored ringing, busy or idle detected message from said input-output data storage circuit and to store a code identifying the associated subscriber station in said first microprocessor storage means.

12. A secretarial telephone station as claimed in claim 11, wherein said second microprocessor storage means comprises a random-access-memory.

13. A secretarial telephone station as claimed in claim 11, wherein said second processing unit further comprises an input-output and signalling timer circuit connected between said second microprocessor and said line driver said and operative to control the timing of message transfers between said second microprocessor and said line driver.

* * * * *